US010083370B2

(12) United States Patent
Ishiyama et al.

(10) Patent No.: US 10,083,370 B2
(45) Date of Patent: Sep. 25, 2018

(54) IDENTIFICATION SYSTEM, IDENTIFICATION METHOD, MATCHING DEVICE, AND PROGRAM

(71) Applicant: NEC Corporation, Minato-ku, Tokyo (JP)

(72) Inventors: Rui Ishiyama, Tokyo (JP); Toru Takahashi, Tokyo (JP)

(73) Assignee: NEC CORPORATION, Tokyo (JP)

(*) Notice: Subject to any disclaimer, the term of this patent is extended or adjusted under 35 U.S.C. 154(b) by 73 days.

(21) Appl. No.: 14/781,653

(22) PCT Filed: Mar. 28, 2014

(86) PCT No.: PCT/JP2014/059281
§ 371 (c)(1),
(2) Date: Oct. 1, 2015

(87) PCT Pub. No.: WO2014/163014
PCT Pub. Date: Oct. 9, 2014

(65) Prior Publication Data
US 2016/0055398 A1 Feb. 25, 2016

(30) Foreign Application Priority Data
Apr. 4, 2013 (JP) ................. 2013-078801

(51) Int. Cl.
G06K 9/00 (2006.01)
G06K 9/62 (2006.01)
(Continued)

(52) U.S. Cl.
CPC ....... *G06K 9/6215* (2013.01); *G06F 17/3028* (2013.01); *G06K 9/00577* (2013.01);
(Continued)

(58) Field of Classification Search
CPC ...... G06K 9/6215; G06K 9/2054; G06K 9/46; G06K 9/34; G06K 9/036; G06K 9/00577;
(Continued)

(56) References Cited

U.S. PATENT DOCUMENTS 6,263,086 B1 * 7/2001 Wang ................. G06T 1/005
380/54
7,065,228 B2 * 6/2006 Brundage ......... B29C 45/14688
264/297.2
(Continued)

FOREIGN PATENT DOCUMENTS

CN 1577393 A 2/2005
JP 2009-284455 A 12/2000
(Continued)

OTHER PUBLICATIONS

English translation of the foreign application filed in the IDS JP2008-133495A.*
(Continued)

*Primary Examiner* — Aaron W Carter

(57) ABSTRACT

The invention in this application is an information acquisition/identification system provided with an image-feature storing unit, an extracting unit, an acquiring unit, and an identifying unit. The image-feature storing unit stores image features of texture patterns formed on components or products. The extracting unit extracts an information-label image and a texture-pattern image from a taken image containing at least the following: an information label that displays information regarding a component, a product, or a product comprising said component; and a texture pattern formed on said component or product. The acquiring unit acquires, from the extracted information-label image, the aforementioned information regarding the component or product. The identifying unit identifies the component, product, or component-comprising product by matching image features of
(Continued)

the extracted texture-pattern image against the image features stored by the image-feature storing unit.

23 Claims, 9 Drawing Sheets

(51) Int. Cl.

| | | |
|---|---|---|
| G06K 9/03 | (2006.01) | |
| G06K 9/34 | (2006.01) | |
| G07D 7/2033 | (2016.01) | |
| G06F 17/30 | (2006.01) | |
| G06K 9/46 | (2006.01) | |
| G06Q 30/00 | (2012.01) | |
| G06T 7/40 | (2017.01) | |
| G06K 9/20 | (2006.01) | |

(52) U.S. Cl.
 CPC .......... G06K 9/036 (2013.01); G06K 9/2054 (2013.01); G06K 9/34 (2013.01); G06K 9/46 (2013.01); G06Q 30/0185 (2013.01); G06T 7/40 (2013.01); G07D 7/2033 (2013.01); G06K 2009/0059 (2013.01)

(58) Field of Classification Search
 CPC ... G06Q 30/0185; G06F 17/3028; G06T 7/40; G07D 7/2033
 See application file for complete search history.

(56) References Cited

U.S. PATENT DOCUMENTS

| | | | | |
|---|---|---|---|---|
| 8,323,780 | B1* | 12/2012 | Simske | .................... B41M 3/14 283/85 |
| 2005/0212654 | A1* | 9/2005 | Yoda | .................. G07C 9/00166 340/5.53 |
| 2005/0220349 | A1 | 10/2005 | Furuya et al. | |
| 2008/0219503 | A1 | 9/2008 | Di Venuto et al. | |
| 2009/0080760 | A1* | 3/2009 | Knysh | ................ G06K 9/00577 382/141 |
| 2011/0257743 | A1* | 10/2011 | Schuessler | ................ A61F 2/12 623/8 |
| 2012/0043648 | A1* | 2/2012 | Matsumaru | ........... H01L 21/565 257/618 |
| 2013/0024326 | A1* | 1/2013 | Dearing | ................ G06Q 30/02 705/26.61 |
| 2013/0122662 | A1* | 5/2013 | Matsumaru | ........... H01L 21/565 438/127 |
| 2014/0195382 | A1 | 7/2014 | Ishiyama | |
| 2015/0154760 | A1* | 6/2015 | Ishiyama | ........... G06K 9/00577 382/203 |
| 2015/0189238 | A1* | 7/2015 | Ishiyama | ................ G06Q 50/04 348/86 |
| 2016/0042245 | A1* | 2/2016 | Ishiyama | ........... G06K 9/00577 382/190 |
| 2016/0048730 | A1* | 2/2016 | Ishiyama | ........... G06K 9/00577 382/108 |
| 2016/0055398 | A1* | 2/2016 | Ishiyama | ........... G06K 9/00577 382/190 |
| 2017/0287147 | A1* | 10/2017 | Takahashi | ................. G06T 7/35 |
| 2018/0036928 | A1* | 2/2018 | Funakoshi | ............. B29C 45/76 |
| 2018/0082157 | A1 | 3/2018 | Ishiyama | |

FOREIGN PATENT DOCUMENTS

| | | |
|---|---|---|
| JP | 2003-138486 A | 5/2003 |
| JP | 2005-129016 A | 5/2005 |
| JP | 2007-089969 A | 4/2007 |
| JP | 2007-108973 A | 4/2007 |
| JP | 2008-009539 A | 1/2008 |
| JP | 2008-098949 A | 4/2008 |
| JP | 2008-133495 A | 6/2008 |
| JP | 2012-043953 A | 3/2012 |
| WO | 2007/028799 A1 | 3/2007 |
| WO | 2012/126008 A2 | 9/2012 |
| WO | 2013/018614 A1 | 2/2013 |
| WO | 2013/018615 A1 | 2/2013 |

OTHER PUBLICATIONS

International Search Report for PCT Application No. PCT/JP2014/059281, dated Jun. 10, 2014.
Lorenzo Cozzella et al., "Drug packaging security by means of white-light speckle", Optics and Lasers in Engineering 50 (2012), Elsevier, May 21, 2012, Amsterdam, NL, pp. 1359-1371.
Extended European Search Report for EP Application No. EP14779072.9 dated Oct. 27, 2016.
Chinese Office Action for CN Application No. 201480031959.X dated Mar. 27, 2017 with English Translation.
Intrinsic characteristics for authentication Sep. 2006 (Authentication News), 3 pages.
Alp Vision Fingerprint: "A breakthrough in authenticating original products without any markings", Sep. 25, 2006 (Alp Vision SA—Roland Meylan), 1 page.
Communication pursuant to Rule 114(2) EPC for No. 14779072.9 dated Oct. 6, 2017.
Japanese Office Action for JP Application No. 2015-510061 dated May 9, 2018 with English Translation.

* cited by examiner

AS θ BECOMES LARGER, BLACK BACKGROUND ZONE BECOMES LARGER, AND BLACKEN PORTION OF TEXTURED SURFACE ALSO BECOMES LARGER.

AS θ BECOMES SMALLER, BLACK BACKGROUND ZONE BECOMES SMALLER, AND BLACKEN PORTION OF TEXTURED SURFACE ALSO BECOMES SMALLER.

MATCHING RESULT

FIG. 5

| SERIAL NUMBER | IMAGE FEATURE | MANAGEMENT INFORMATION |
|---|---|---|
| 1234 | AAA | XXXXXXXXX |
| 1235 | BBB | XXXXXXXXX |
| ... | ... | ... |

IDENTIFICATION SYSTEM, IDENTIFICATION METHOD, MATCHING DEVICE, AND PROGRAM

This application is a National Stage Entry of PCT/JP2014/059281 filed on Mar. 28, 2014, which claims priority from Japanese Patent Application 2013-078801 filed on Apr. 4, 2013, the contents of all of which are incorporated herein by reference, in their entirety.

TECHNICAL FIELD

The present invention relates to an identification system, an identification method, a matching device, and a program.

BACKGROUND ART

Generally, for the purpose of indication of source, quality control, and distribution management, a logo or an identification code which indicates information of a component or a product is assigned to the component and the product.

Further, there is such a technology that, for the purpose of counterfeit protection of a component and a product and individual identification of a component or a product to which an identical mark or an identical code is assigned, an RFID (Radio Frequency Identification) tag, etc. is used to perform certification and identification of the component or the product. Patent literature 1 discloses one example of such technology. More specifically, patent literature 1 discloses such a system that an IC (Integrated Circuit) tag is wound around an adherend to fix the tag thereon, and the adherend is identified by using the IC tag.

CITATION LIST

Patent Literature

[Patent Literature 1] JP 2008-009539A

SUMMARY OF INVENTION

Technical Problem

A logo or an identification code such as a serial code is effective information to be used in indication of source, quality control, and distribution management. The identification code is read out by a reader or the like. However, the identification code can be changed or counterfeited with ease and has an upper limit in an information volume. Therefore, the identification code is not safe enough to identify an individual.

Now, in order to avoid the change and the counterfeit, it is proposed to attach an RFID as disclosed in patent literature 1 to achieve accurate individual identification. However, this requires a large cost.

Further, in a case of attaching the RFID to each individual, it is required for one who is in charge of an identification operation to read information of logo or identification code and to read certification information of the RFID, etc. separately. This leads to a problem of a large cost and much time consumption.

The present invention was made to solve the above described problem. A purpose of the present invention is to provide an identification method capable of performing acquisition of information on a component or a product and identification of the component or the product at low cost without involving unnecessary time-consumption, an identification system, a matching device, and a program.

Solution to Problem

The present invention is an information acquisition and identification system including: image feature storage unit configured to store image feature of a textured pattern formed on a component or a product, extracting unit configured to extract an image of an information display body and an image of the textured pattern from an image including at least the information display body for displaying information on the component, the product, or a product including the component as its component and the textured pattern formed on the component or the products, acquiring unit configured to acquire information on the component or the products from the extracted image of the information display body, and identifying unit configured to identify the component, the product, or the product including the component as its component by matching image feature of the extracted image of the textured pattern with image feature stored in the image feature storage unit.

The present invention is a processing system including: textured pattern forming unit configured to form a textured pattern for identifying a component, a product, or a product including the component as its component on the component or the products to which an information display body for displaying information on the component, the product, or the product including the component as its component is attached.

The present invention is a registration system including: image capturing unit configured to capture, under specific image capturing conditions, an image including at least a textured pattern and an information display body which displays information on a component, a product, or a product including the component as its component, extracting unit configured to extract the image of the textured pattern from the captured image, and registering unit configured to register in storing unit identification information for identifying the component or the products and image feature of the extracted image of the textured pattern in associated with each other.

The present invention is a matching device including: extracting unit configured to extract an image of an information display body and an image of a textured pattern from an image including at least the information display body for displaying information on a component, a product, or a product including the component as its component and the textured pattern formed on the component or the products, acquiring unit configured to acquire information on the component or the products from the extracted image of the information display body, and acquiring and outputting unit configured to acquire and output a matching result obtained by matching the extracted image of the textured pattern with a database which stores image feature of textured patterns formed on predetermined areas.

The present invention is an information acquisition and identification method including: extracting an image of an information display body and an image of a textured pattern from an image including at least the information display body for displaying information on a component, a product, or a product including the component as its component and the textured pattern formed on the component or the products, acquiring information on the component or the products from the extracted image of the information display body, and identifying the component, the product, or the product including the component as its component by using the extracted image of the textured pattern.

The present invention is a program causing a computer to perform: extraction processing of extracting an image of an information display body and an image of a textured pattern from an image including at least the information display body for displaying information on a component, a product, or a product including the component as its component and the textured pattern formed on the component or the products, acquisition processing of acquiring information on the component or the products from the extracted image of the information display body, and acquisition and output processing of acquiring and outputting a matching result obtained by matching the extracted image of the textured pattern with a database which stores image feature of the formed textured patterns.

Advantageous Effect of Invention

The present invention ensures acquisition of information on a component or a product and identification of the component or the product at low cost without involving unnecessary time-consumption.

BRIEF DESCRIPTION OF DRAWINGS

FIG. 5 exemplifies an image feature database.

DESCRIPTION OF EMBODIMENTS

Figure 1:
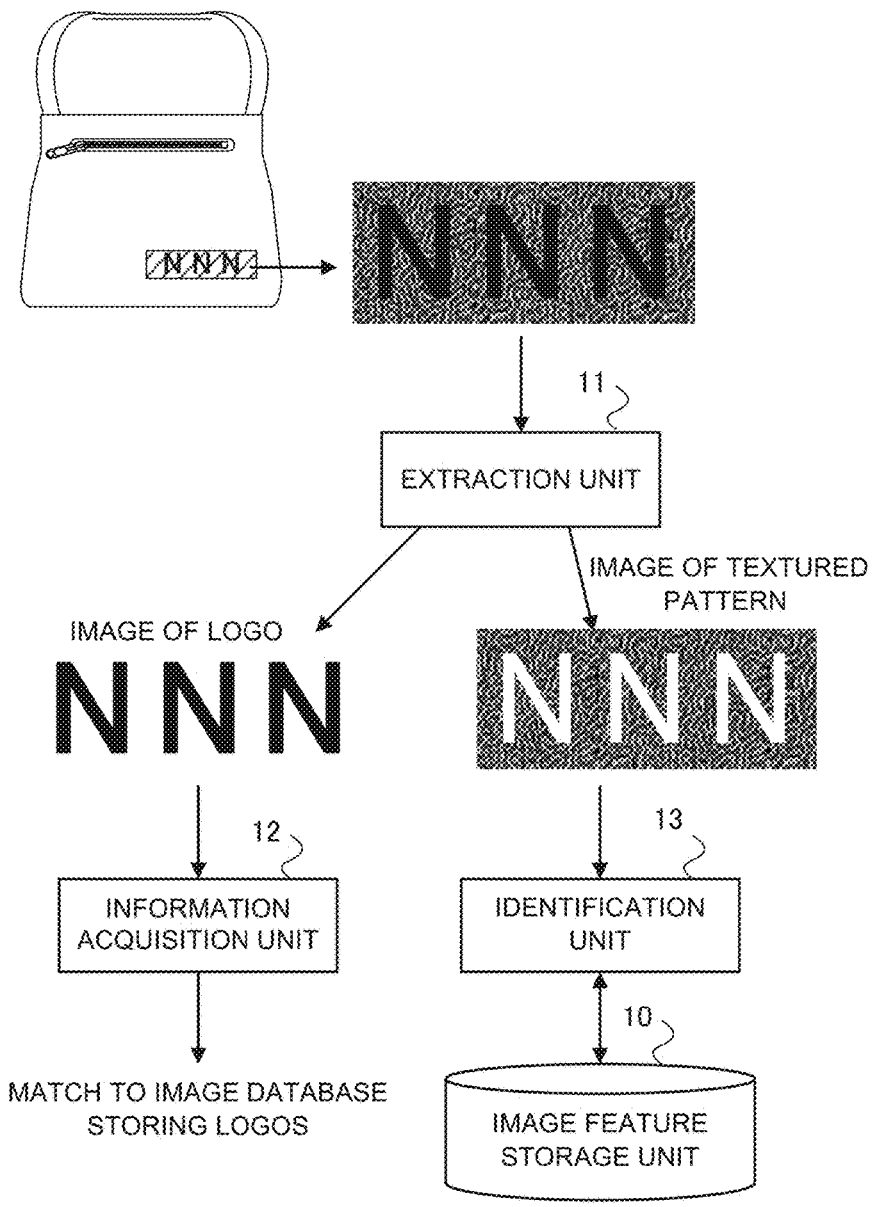
FIG. 1 is a block diagram of a first embodiment according to the present invention.

The present invention is characterized by extracting an image of an information display body and an image of a textured pattern from an image including at least the information display body for displaying information on a component, a product, or a product including the component as its component and the textured pattern formed on the component or the products, acquiring information on the component or the products from the extracted image of the information display body, and identifying the component, the product, or the product including the component as its component by using the extracted image of the textured pattern.

The present embodiment will be described below.

The component is a component manufactured by a manufacturer. Examples of the component include logo plates, fastening components (rivets, slide fasteners, hook and loop fasteners, snap fasteners, rail fasteners, buckles, cord stoppers, belt adjusters, swivels, snap buttons, buttons, etc.), bolts, nails, packages and outer covers of semiconductor chips, plastic components, machine components, etc. of gear frame bearing wheels (vehicles, bicycles, etc.). Further, it is not necessary for the component of the present invention to be always integrally attached to the other component or product. It is possible for the component of the present invention to include an item capable of temporarily sealing or fixing something, e.g., containers (cans, caps, battery packs, etc.) and seals or labels (fastening plates, etc.), etc.

The product is a product manufactured by a manufacturer or a product purchased by a consumer. Examples of the product include apparel products such as bags and clothes, watches, accessories, leather products, metalworking products (building materials such as window sashes (window frames), keys, tools such as wrenches and sockets, wristwatches, golf clubs, etc.), wood products, industrial products (semiconductor chips and electronic equipment mounted with semiconductor chips, etc.), etc.

The information display body displaying information on a component or a product expresses the information on the component or the product with letters and/or figures. Examples of the information display body include a serial number, a trademark, a logo, a name of manufacturer, a name of producer, a brand name, a product name, a product number, a rod number, and a URL (Uniform Resource Locators).

The textured pattern formed on a component or a product includes both of a textured pattern which is formed on a component or a product for a decorative purpose and a textured pattern which is formed on a component or a product on purpose in order to identify the component or the product. Further, the textured pattern includes, for example, scratches, minute bumps and dips (concavities and convexities), and design patterns which are generated naturally or on purpose on a surface of a casting during manufacturing and processing by means of machining or press working. Still further, the textured pattern is a concept including not only a textured pattern formed by processing of metals, synthetic resins (plastics, etc.), etc. but also texture (grain), etc. obtained by providing surface processing (e.g., surface texturing) on leather products. For example, in a case of a leather bag provided with surface texturing, minute bumps and dips are formed randomly on a surface of the leather bag, and the minute bumps and dips can be also considered as textured pattern.

Here, the textured pattern may be formed on a skeleton part of the information display body, or may be formed on a background area of the information display body.

Figure 9:
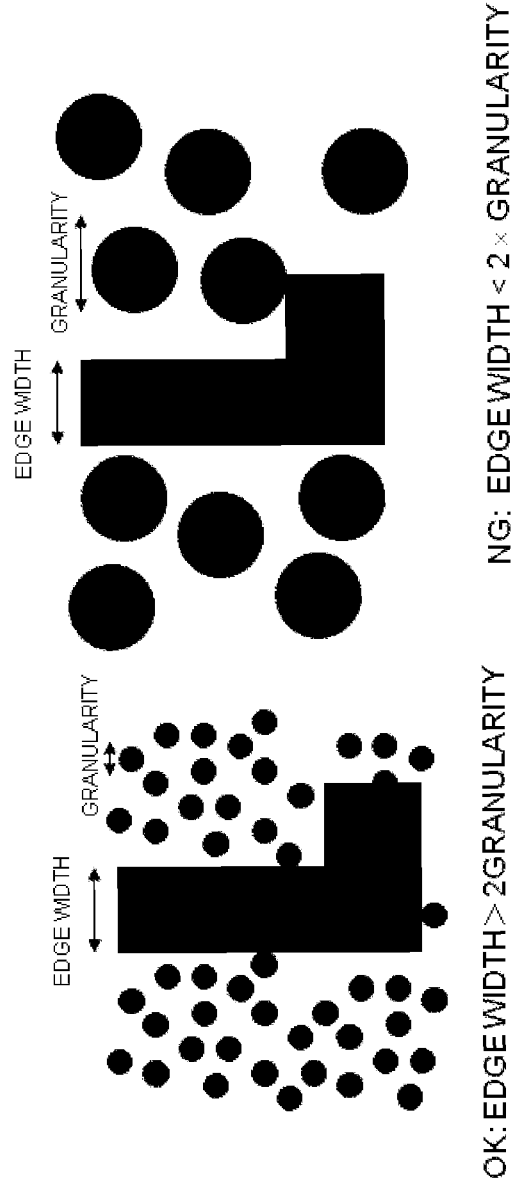
FIG. 9 illustrates granularities of textured patterns.

The textured pattern may have any granularity (e.g., may have any size, any diameter, any density, etc. of a particle(s)) in so far as the granularity does not affect on recognition of the information display body. It is sufficient that the granularity of the textured pattern is smaller than granularity of the information display body. For example, the textured pattern is formed in a manner that, as illustrated in FIG. 9, granularity (diameter) of each bump and dip of the textured pattern (including a bump and dip which is made of adjacent bumps and dips formed into an aggregate) becomes smaller than a half of an edge width of a skeleton part of the information display body. As described later, in a case of assuming that the textured pattern is removed by using a filter for removing a high frequency component corresponding to granularity of a textured surface, if a size of the bump and dip of the textured surface is larger than the half of the edge width of the information display body, the edge of the information display body is also removed during removal of the textured surface. However, if the granularity of the bump and dip of the textured pattern is formed smaller than the edge width of the skeleton part of the information display body to a level at which the information display body can be recognized, the textured pattern can be removed while the edge of the information display part can be remained as it is. Therefore, it becomes easy to separate image feature of the information display body from image feature of the textured pattern. For example, in a case where the information display body is an outlined letter, it is preferable that the granularity of the bump and dip of the textured pattern is small enough than an outline width of the letter (e.g., smaller than a half of the outline width of the letter), i.e., is small enough but the information display body still can be recognized. Alternatively, a textured surface may be subjected to blast working in order to reduce density with dots smaller than a thickness of a line of the information display body.

In the extraction processing of extracting the image of the information display body and the image of the textured pattern from the captured image, the filter for removing high frequency component is applied to remove the textured pattern from the captured image, the high frequency component corresponding to the size of the granularity of the textured surface. This ensures acquisition of the image of the information display body. A blurred image of the information display body that the textured surface was deleted is recovered, as required, by using a recovery technique for recovering a low resolution image. A super resolution technique disclosed in, for example, WO 2012/029238A1 may be employed for the recovery technique. Alternatively, any other recovery technique may also be employed. The image of the textured pattern is acquired by taking a difference between the original image and the captured image (the image of the information display body) after removing the high frequency component.

In the processing of obtaining image feature from the image of the textured pattern, at least a portion of the information display body is used as a reference section to normalize the image of the textured pattern, and thereafter the image feature thereof are extracted. Storage of feature of letters and figures as reference portions enables normalization of the image of the textured surface by using the reference portions. The normalization in the present embodiment includes, for example, normalization of geometrical transformation including at least one of a size, a position, an orientation, etc. of a captured image and normalization of a luminance value of a captured image. Extraction of feature from thus normalized image of textured pattern can be performed by using an extraction technology for extracting image feature of a finger print which can extract, for example, a luminance value and a feature point of an image, an inflection point of a line of a binarized image, an interunit point, an inter-edge point, and a central point of an image.

First Embodiment

A first embodiment according to the present invention will be described below.

FIG. 1 is a block diagram of the first embodiment according to the present invention.

An identification system of the first embodiment according to the present invention includes an image feature storage unit 10, an extraction unit 11, an acquisition unit 12, and an identification unit 13. The image feature storage unit 10 stores image feature of a textured pattern formed on a component, a product, or a product including the component as its component. The extraction unit 11 extracts an image of an information display body and an image of the textured pattern from an image including at least the information display body for displaying information on the component, the product, or the product including the component as its component and the textured pattern formed on the component or the products. The acquisition unit 12 acquires information on the component or the products from the extracted image of the information display body. The identification unit 13 identifies the component, the product, or the product including the component as its component by matching (collating) image feature of the extracted image of the textured pattern with image feature stored in the image feature storage unit 10.

In the following description, a case of identifying a bag is exemplified. The bag to be identified includes a logo as the information display body and a logo plate having a prescribed area with the logo, the prescribed area being provided with a textured pattern.

The extraction unit 11 acquires an image of a collation area (matching area) including the logo of the logo plate, the logo plate being attached to the bag, and extracts an image of the logo and an image of the textured pattern from the acquired image. Here, the collation area is the prescribed area including the logo and at least partially includes the textured pattern formed thereon.

There are mainly two methods for processing the textured pattern formed on the collation area.

One of the two methods is a method for forming a textured pattern to a mold which manufactures an article by means of mold injection or casting. Various methods such as etching and blasting can be employed for forming the textured pattern to the mold. In a general method, granularity of a textured surface can be controlled; however, it is impossible to accurately reproduce a size or a position of each one of minute bump and dip. More specifically, a different pattern is generated in each time when a textured pattern is formed. Therefore, in a case where a plurality of molds are manufactured for manufacturing the same articles, the minute bumps and dips on a textured surface-processing area of each mold differ for each casting mold. As a matter of course, in a case of producing a counterfeit, it is possible to counterfeit a mold which is similar at a glance. However, it is hard to perfectly copy every one of the minute bumps and dips on the textured surface. With the method, it is possible to form almost the same textured pattern to all the individuals manufactured from the same mold. In other words, a different mold forms different minute feature in a textured pattern. In such case, at least one group of individuals (group of articles) manufactured by a certain mold is selected, and image feature of a textured pattern of a collation area of the individual is considered as a representative value working as a reference for identification. The representative value is registered in the image feature storage unit 10. With the method, a component or a product having image feature similar to the registered image feature by a level equal to or greater than a prescribed similarity can be identified as the component or the product on which the textured pattern is formed by the same mold. That is, the group of individuals (group of components or group of products) manufactured from a specific mold can be advantageously matched by using a small amount of registration data.

The other one of two methods is a method of forming a textured surface by generating minute bumps and dips pattern randomly on each individual by means of, for example, etching, blasting, machining, crystal/powder coating, dispersed plating, etc., or by generating minute bumps and dips surface by means of plating or coating. In such method, thus formed textured pattern differs for each individual. Image feature of the textured pattern formed on the collation area of the each individual (each component or each product) are registered in the image feature storage unit 10 one by one. According to the method, since the textured pattern differs for each individual (for each component or for each product), the image feature can be advantageously matched (identified) by individual unit of component or product.

Further, it is possible to combine the above described two methods. More specifically, it is possible for a portion that a textured pattern has been formed by mold processing to be further subjected to coating or plating, thereby facilitating generation of an individual difference in minute bumps and dips. This can further improve discrimination between individuals. At the time, a difference in feature between molds remains, whereas a difference in feature between individuals generated by the processing is further added thereto. This enables identification by both of mold unit and individual unit. Specifically, if a bump and dip provided on a textured surface of a mold is roughen more than a bump and dip made in the below mentioned processing of a textured surface, it becomes possible to make the difference in mold unit larger than the difference in individual unit. With the above described method, with respect to a threshold for a similarity of an amount of feature at the time of matching (at the time of identification), a threshold at the time of identification in mold unit can be more moderate than a threshold at the time of identification in individual unit. Accordingly, it becomes possible to perform matching with a small amount of registration data as described above. Further, by taking this advantage, it becomes possible initially to perform identification in mold unit to decrease an amount of data to be matched and, subsequently, to perform identification of individual. Such hierarchical identification ensures decrease of a load of identification processing.

Next, capturing of an image of a textured pattern of a collation area, extraction of image feature of a textured pattern of a collation area, and registration thereof in the image feature storage unit 10 will be described below. In the present embodiment, a prescribed area including a logo is referred to as a collation area, and thus image feature of textured pattern formed on collation area is preliminary extracted to be stored in the image feature storage unit 10. In the processing of forming a textured surface by using a mold, a several number of logo plates are selected from logo plates after they are provided with textured surfaces by using the same mold, and images of textured patterns of collation areas of those logo plates are captured by an imaging device or an image of a portion of the textured surface of the mold (a portion for forming a textured pattern on a component, etc.) is captured by an imaging device. Further, during the processing of forming a textured surface, an image of textured pattern of collation area of each logo plate is captured by a imaging device. Image feature are extracted from the textured patterns obtained from the captured images and are registered in the image feature storage unit 10. Meanwhile, an extraction technology for extracting image feature of a finger print capable of extracting, for example, a luminance value and a feature point of an image, an inflection point of a line of a binarized image, an interunit point, an inter-edge point, and a central point of an image, may be employed for extracting image feature of the captured images.

Further, when image feature of a logo plate are registered in the image feature storage unit 10, management information on a bag which has a logo plate as one of its components is also registered in the image feature storage unit 10 correspondingly to the image feature of the logo plate. Accordingly, identification of logo plate enables identification of bag.

Here, in some cases, the image feature of textured patterns differ from one another between the same components or between the same products according to lighting conditions when capturing images thereof. This is because, positions of shadows generated by the bumps and dips of the textured patterns differ from one another depending on light irradiation directions, and thus the image feature appear to be different. Therefore, it is preferable to capture images of collation areas always under the same lighting conditions.

Therefore, it is preferable to use, for example, a imaging support device and a imaging device for capturing an image of a collation area of a component or a product. Hereinafter, examples of the imaging support device and the imaging device used in the present embodiment will be described.

Figure 2:
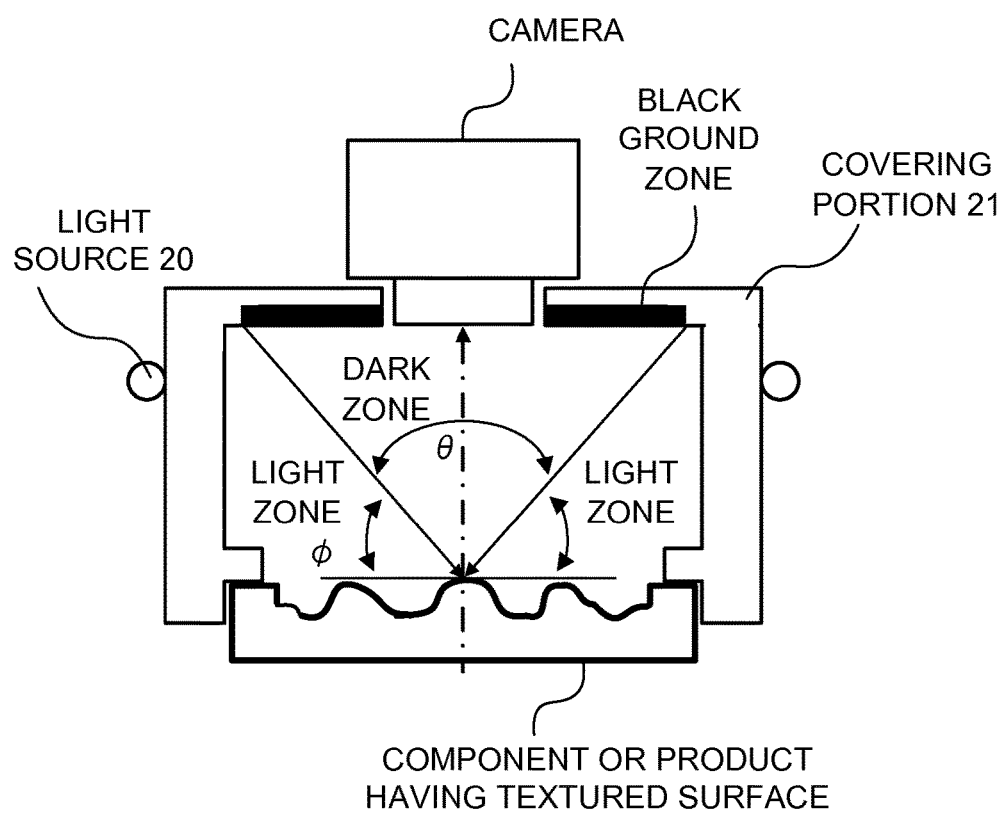
FIG. 2 illustrates a configuration of an imaging support device and an imaging device to be employed in the embodiment.

FIG. 2 illustrates an imaging support device and a imaging device used in the present embodiment. The imaging support device of the present embodiment assists capturing of an image of a collation area on a surface having minute bumps and dips and having strong mirror reflection, e.g., on a textured surface with a textured pattern. The imaging support device of the present embodiment includes a light source unit 20 and a covering portion 21. The light source unit 20 emits light. The covering portion 21 is formed into a shape capable of covering a prescribed area of a surface of a component or a product and includes a black ground zone and the other zone The black ground zone is configured that a portion of a surface corresponding to a range within a prescribed angular range from a normal direction, the portion of the surface facing to the prescribed area, absorbs light. The other zone configured that the surface corresponding to a range within the other angular ranges, consists of the light source unit 20 or a light source area surface diffusing light emitted by the light source unit 20.

For example, the covering portion 21 is formed in parallel with a textured surface and provided with an image capturing hole for capturing an image from the normal direction of the textured surface. The covering portion 21 is provided with an upper surface which includes a black ground zone at a position facing to the textured surface and side surfaces which are perpendicular to the upper surface. The side surfaces are made of a material which diffuses light of light source unit 20.

The black background zone of the covering portion 21 is defined by an angular range θ of a dark zone and an angular range φ of a light zone with respect to a normal line of a surface (e.g., a peak portion of bumps residing at a center of a collation area) within a collation area of a textured surface of a component or a product. As described above, a distribution between the black ground zone and the diffusive surfaces is defined only by the angular range with respect to the normal direction of the textured surface. More specifically, the diffusive surfaces may have any shape or any angle. In other words, the description that the diffusive surfaces made of the diffusing member are perpendicular to the black ground zone is a mere example. The diffusive surfaces made of the diffusing member may be formed into any shape or have any placement angle. Similarly, the black ground zone does not necessarily have a plane surface but may have any shape in so far as the black ground zone is capable of covering the entire range from the normal line of the textured surface through the angle θ.

Figure 3:
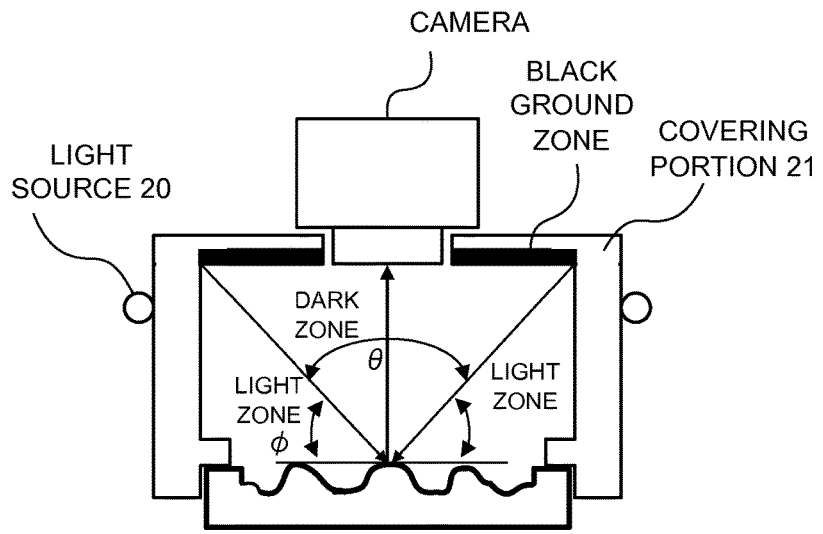
FIG. 3 illustrates a relationship between a size of a black background zone of a covering portion and an angular range θ of a dark zone of the imaging support device and the imaging device of FIG. 2.
Figure 3:
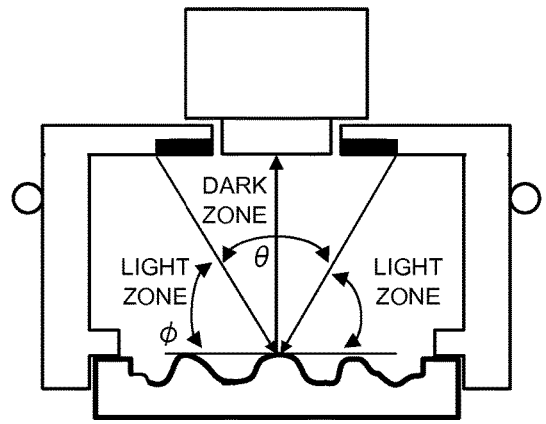

The black background zone of the covering portion 21 does not reflect illumination light from the light source unit 20. Therefore, a the peak portion of bumps of the textured surface is blacken in the image, the textured surface being placed facing to a camera which is fixed to an image capturing hole in an upper surface. As shown in FIG. 3, a size of the black background zone of the covering portion 21 and the angle range θ of the dark zone relates to each other. That is, as the angle range θ of the black dark zone becomes larger, the black background zone of the covering portion 21 also becomes larger. Whereas, as the angle range θ of the dark zone becomes smaller, the black background zone of the covering portion 21 also becomes smaller. Further, as the black background zone of the covering portion 21 becomes larger, the blacken portion of the textured surface in an image becomes larger. Whereas, as the black background zone becomes smaller, the blacken portion of the textured surface in an image also becomes smaller. In the present embodiment, the angular ranges θ and φ are adjusted in a manner that the number of black pixels within the collation area or a degree of separation of a luminance value of pixels within the collation area in an image of the textured surface comes to be a predetermined value (e.g., 25%). More specifically, the size of the black background zone of the covering portion 21 may be changed, or a height of the side surfaces of the covering portion 21 may be changed. This can be achieved by various methods. As one example thereof, a screw mechanism for moving the black background zone up and down can be employed, and thus rotation of the screw mechanism is contributed to adjustment of the height of the side surfaces of the covering portion 21. This is a mere example, and it is possible to employ also other methods.

An actual size of the dips and bumps of the textured surface changes according to a parameter, during processing, of a component or a product to be identified. Therefore, it is possible to optimize a luminance distribution of a captured image by adjusting angular ranges θ and φ and to make the black background zone to an adequate size. Meanwhile, a luminance value at which a first differential value of a histogram of a luminosity change becomes the maximum value is employed as a threshold at the time of binarization.

Accordingly, the peak portion of bumps of the textured surface having the normal line in the direction facing to the camera is blacken in the image, whereas the dips of the textured surface not facing to the camera receives lights from various directions and reflection of the lights causes the dips whitened in the image. Therefore, it is possible to obtain an image having a clearly enhanced contrast in light and shade of the dips and bumps. As a result, the peak can be extracted as a feature point in a stable manner.

An extraction unit 11 extracts image feature of a logo and an image of a textured pattern from an image of a collation area. In this extraction processing, firstly, the textured pattern is deleted from the image by using a filter for removing a high frequency component to thereby acquire an image of the logo. Then, a difference between the image and the obtained image of the logo is calculated to obtain an image of the textured pattern.

An information acquisition unit 12 acquires information on a logo plate and a bag with the logo plate by using the image of the logo extracted by the extraction unit 11. For example, the extracted image of the logo may be matched with images stored in an image database in which images of logos are registered as trademarks. Accordingly, it becomes possible to known whether or not the extracted image of the logo is registered as a trademark.

An identification unit 13 extracts image feature from the image of the textured pattern extracted by the extraction unit 11. When extracting the image feature of the textured pattern, at least a portion of the logo is used as a reference section to normalize the image of the textured pattern, and subsequently the image feature thereof are extracted. Then, the extracted image feature are matched with image feature of textured patterns registered in the image feature storage unit 10 to thereby identify the logo plate. Identification of the logo plate enables identification of the bag on the basis of the management information associated with the image feature of the logo plate.

As described above, according to the present embodiment, an image of the information display body attached to a component or a product and an image of the textured pattern can be read out at the same time, and therefore, acquisition of information on the component or the product (information common to products to which the same information display body is attached) and each individual identification of the component or the product having the same information display body can be performed efficiently. Further, it is easy to find the information display body in the form of a logo, etc. attached to a component or a product, so that a person in charge of an identification operation can easily specify a location of which image should be captured.

Second Embodiment

A second embodiment of the present invention will be described below.

In the second embodiment, the information display body is a serial number. The second embodiment is directed to an identification system for identifying a bag having a plate, as its component, including a textured pattern formed on a collation area with a serial number as the information display body.

Figure 4:
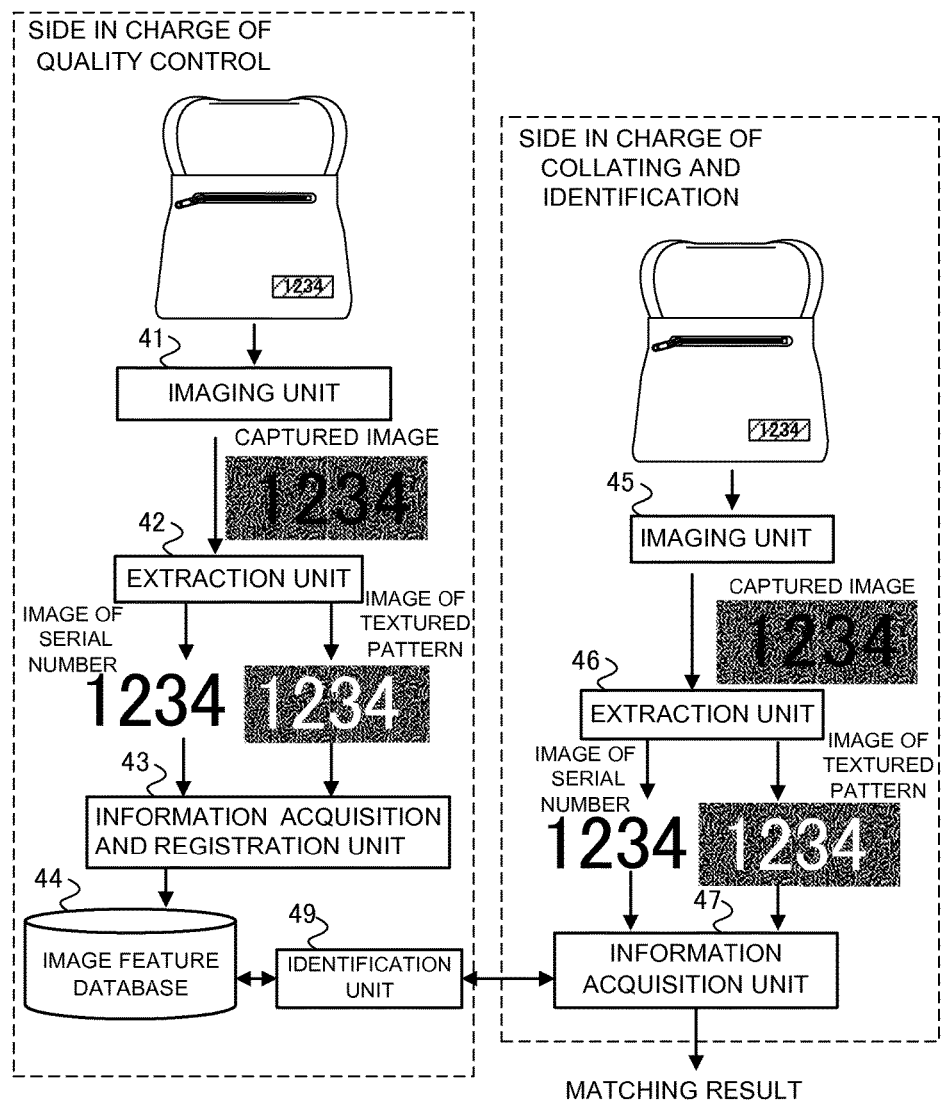
FIG. 4 is a block diagram of a second embodiment according to the present invention.

FIG. 4 is a block diagram of an identification system according to the second embodiment.

An imaging unit 41 is a tool to be used by a side in charge of manufacturing a bag (a manufacturer of a bag, etc.) or a tool to be used by a side of an administrator who performs quality control of a bag. The manufacturer, etc., uses the imaging unit 41 to capture an image of a collation area of a plate attached to a bag. Meanwhile, the imaging unit 41 captures an image under the above described predetermined image capturing conditions.

An extraction unit 42 extracts an image of a serial number and an image of a textured pattern from the image captured by the imaging unit 41. Extraction of each of the image of serial number and the image of textured pattern is performed in a manner similar to the case of the first embodiment.

An information acquisition and registration unit 43 performs letters recognition processing with respect to the image of the serial number extracted by the extraction unit 42. Further, the information acquisition and registration unit 43 extracts image feature of the image of the textured surface extracted by the extraction unit 42. The serial number after it is subjected to the letters recognition processing is registered in the image feature database 44 in associated with the image feature of the textured surface. The image feature database 44 is also a tool for the use of a side of a manufacturer of a bag or a side of an administrator who performs quality control of a bag. As shown in FIG. 5, a serial number, image feature of a textured pattern in a collation area of a plate on which a serial number is printed, and management information on a bag provided with the plate attached thereto are stored in associated with each other. Meanwhile, the management information includes not only identification information on a component, a product, or a product including the component attached thereto, but also management information on a component or a product, e.g., a production site of a component or a product, production information such as a brand and a production date, and a product name in which the component is employed, and distribution information such as destination and ship date.

As described above, if the image feature of the textured pattern of the component being associated with the management information on the component, the product, or the product provided with the component, it becomes possible to perform acquisition of history information on the identified plate (component) and identification of a bag with the plate (product having the component as one of its components).

An imaging unit 45, an extraction unit 46, and an information acquisition unit 47 are tools to be used by a side in charge of collating a bag such as a testing department, a destination, a shop, and a purchaser of the bag.

The imaging unit 45 has a structure similar to that of the imaging unit 41. More specifically, the imaging unit 45 captures an image of a collation area of a plate of a bag to be identified.

The extraction unit 46 has a structure similar to that of the extraction unit 42. More specifically, the extraction unit 46 extracts an image of the serial number and an image of the textured pattern from the image captured by the imaging unit 45.

The information acquisition unit 47 acquires information on the plate or the bag from the image of the serial number extracted by the extraction unit 46. In the present embodiment, the letters recognition processing by, for example, a pattern matching is performed with respect to the image of the serial number extracted by the extraction unit 46. Thereby, a letter recognition result is obtained. Further, the information acquisition unit 47 extracts image feature from the image of the textured pattern extracted by the extraction unit 46. Still further, the information acquisition unit 47 sends the serial number and the image feature extracted from the image of the textured surface to an identification unit 49 of the side of the administrator. Then, the information acquisition unit 47 receives and outputs a matching result thereof.

The identification unit 49 collates the serial number received from the side of the collator with textured patterns. Then, the identification unit 49 sends a collating result thereof. More specifically, the received serial number is collated with serial numbers registered in the image feature database 44. If there is a matching number, image feature of the textured pattern associated with the serial number is matched with the received image feature. Then, the identification unit 49 returns a matching result thereof. In a case where thus collated serial number and the image feature of the textured pattern have been associated with each other to be registered in the image feature database 44, the plate of the bag to be collated is determined as a genuine plate registered in the image feature database 44. From the management information associated with the image feature of the textured surface, the bag with the plate can be identified.

Meanwhile, the above mentioned imaging unit, image feature extraction unit, image feature database, extraction unit, information acquisition unit, and identification unit may be independent from each other but are to be connected to each other via network. Alternatively, some of them may be formed into one piece.

As described above, according to the present embodiment, an image of information display body attached to a component or a product and an image of a textured pattern are read out at the same time, and therefore acquisition of information on the component or the product and identification of the component or the product can be performed efficiently. Further, in the second embodiment, it is possible to store information display body as identification information of a component or a product and image feature of a textured pattern formed on the component or the product in a manner they are corresponded to each other and, under such conditions, to match the image feature of the textured pattern stored after it is associated with the identification information of the information display body acquired from the captured image with the textured pattern acquired from the captured image. This enables certification and identification of the component or the product.

Third Embodiment

A third embodiment according to the present invention will be described below.

Figure 6:
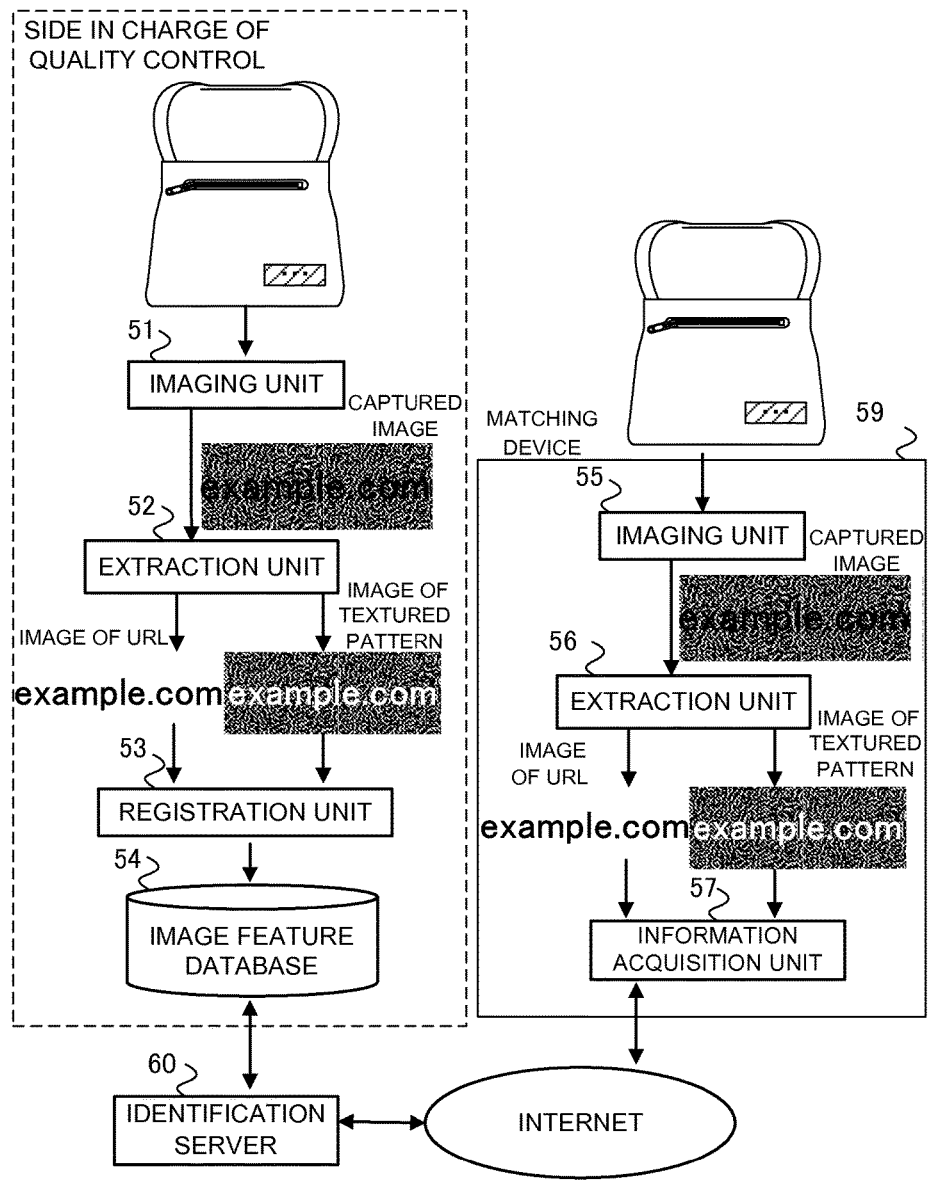
FIG. 6 is a block diagram of a third embodiment according to the present invention.

FIG. 6 is a block diagram of an identification system according to the third embodiment.

In the third embodiment, the information display body is a URL. The third embodiment is directed to an identification system for identifying a bag with a plate as its component. The plate has a collation area including a URL and formed with a textured pattern in its collation area. Meanwhile, in this example, the URL printed on the plate attached to the bag indicates an address of a bag identification site.

An imaging unit 51 is a tool to be used by a side in charge of manufacturing a bag (a manufacturer, etc., of a bag) and a side of an administrator who performs quality control of a bag. The manufacturer, etc., uses the imaging unit 51 to capture an image of a collation area of a plate attached to a bag. The imaging unit 51 has a structure similar to that of the imaging unit 41 of the second embodiment.

An extraction unit 52 extracts an image of the URL and an image of the textured pattern from the image captured by the imaging unit 51. Extraction processing for extracting each of the image of the URL and the image of the textured pattern is similar to that of the first embodiment.

A registration unit 53 extracts image feature of the image of the textured pattern extracted by the extraction unit 52 and registers it in the image feature database 54. The image feature database 54 is a tool to be used by a side of a manufacturer of a bag and a side of an administrator who performs quality control of a bag. The image feature database 54 stores image feature of a textured pattern in a collation area of a plate on which a URL is printed and management information of a bag with a plate in associated with each other. Meanwhile, the management information includes not only identification information on a component, a product, or a product including the component attached thereto, but also management information on a component or a product, e.g., a production site of the component or the product, production information such as a brand and a production date, and a product name in which the component is employed, and distribution information such as destination and ship date. Association between the image feature of the textured pattern of the component and the management information on the component, the product, or the product to which the component is attached, as described above, enables acquisition of history information on the identified plate (component) and identification of the bag with the plate (product having the component as one of its components).

A matching device 59 is a tool to be used by a side in charge of collation and identification of a bag, e.g., an inspection department, a destination, a shop, a purchaser, etc. of the bag. The matching device 59 includes an imaging unit 55, an extraction unit 56, and an information acquisition unit 57.

The imaging unit 55 has a structure similar to that of the imaging unit 51. The imaging unit 55 captures an image of a collation area of a plate attached to a bag to be identified.

The extraction unit 56 has a structure similar to that of the extraction unit 52. The extraction unit 56 extracts an image of a URL and an image of a textured pattern from the image captured by the imaging unit 55.

An information acquisition unit 57 performs letters recognition processing by, for example, pattern matching with respect to the image of the URL extracted by the extraction unit 56 and obtains a letters recognition result. Further, the information acquisition unit 57 extracts image feature from the image of the textured pattern extracted by the extraction unit 56. Then, the information acquisition unit 57 accesses a site of the URL indicated by the letters recognition result via internet, transmits data of the image feature extracted from the image of the textured surface, and requests for identification of the bag. Subsequently, the information acquisition unit 57 receives and outputs a matching result in response to the request.

An identification server 60 is a Web server which provides a bag identification service on the internet. The identification server 60 is connected to the image feature database 54. When the identification server 60 receives data of the image feature of the textured pattern together with a request for identification, the identification server 60 matches the received image feature of the image of the textured pattern with image feature of images of textured patterns registered in the image feature database 54 and returns a matching result thereof to the request source. More specifically, in a case where the received image feature of the textured pattern match any one of the registered image feature, the identification server 60 determines that the plate including the textured pattern formed thereon, i.e., the plate of the request source, is a genuine plate registered in the image feature database 54. Then, the identification server 60 transmits the management information associated with the image feature of the textured pattern to the request source. This enables the request source to identify the bag with the plate.

As described above, according to the present embodiment, it is possible to read an image of information display body attached to a component or a product and an image of a textured pattern at the same time. This ensures effective acquisition of information on a component or a product and identification of a component or a product. Further, in the third embodiment, the information display body is an URL indicating an identification site for identifying a component or a product by using textured patterns. Transmission of the image feature of the textured pattern obtained from the captured image to the URL obtained from the information display body of the captured image enables certification and identification of a component or a product.

Fourth Embodiment

A fourth embodiment of the present invention will be described below.

The fourth embodiment is almost identical to the above described first to third embodiments, except that, when a component or a product is subjected to identification, image feature of a textured pattern to be identified and an identification result thereof are stored in associated with each other.

Figure 7:
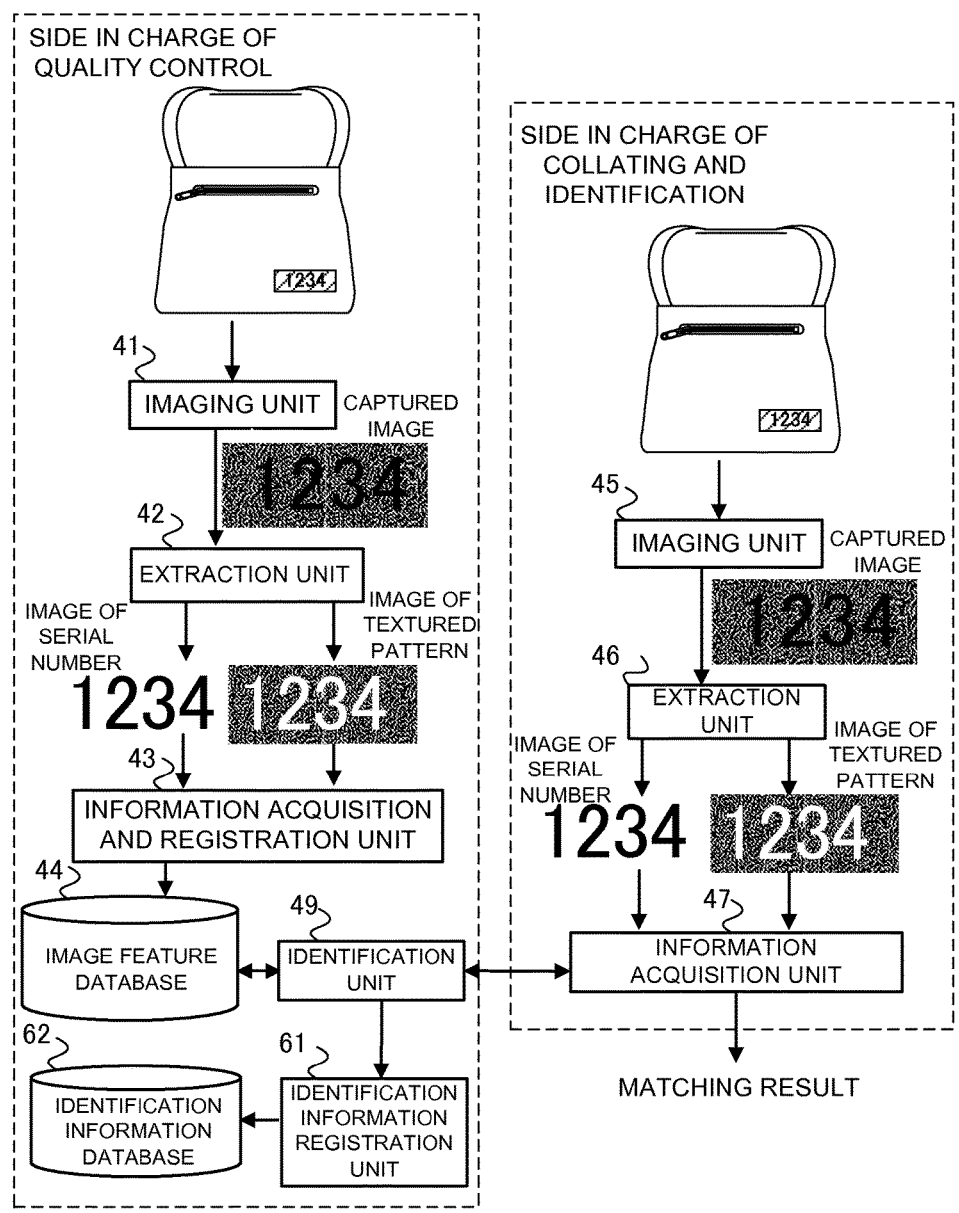
FIG. 7 is a block diagram of a fourth embodiment according to the present invention.

FIG. 7 is a block diagram of the fourth embodiment. An identification system of the present embodiment includes, in addition to the above described structure of the second embodiment, an identification information registration unit 61 and an identification information database 62. The identification information registration unit 61 receives the image feature of the textured pattern which was matched with the image feature database 44 and information on a matching result thereof from the identification unit 49, and registers them in association with each other in the identification information database 62. Alternatively, in a case where the image feature to be identified are registered in the image feature database 44, the identification information registration unit 61 may read out product information, management information, etc. which have been registered in associated with the image feature to be identified in the image feature database 44 and register them in the identification information database 62 in associated with the image feature of the textured pattern.

Further, the fourth embodiment may be provided with a statistical processing unit which performs, by using the identification information database 62 which accumulatively stores the image feature of thus identified textured pattern, the matching result information, etc., statistical processing of information on a predetermined component or product and outputs states of distribution and sale of the product and the use of the product. Still further, the fourth embodiment may be provided with an analyzer capable of statistically processing information of cases in which matching was failed and analyzing a state of occurrence of counterfeits in a case where matching results or certification results of genuineness/spuriousness and matched locations of products are stored as matching result information.

Fifth Embodiment

A fifth embodiment according to the present invention will be described below.

The fifth embodiment is directed to a registration apparatus including a textured pattern forming unit, an imaging unit, an extraction unit, and a registration unit. The textured pattern forming unit forms a textured pattern in which granularity of each dip and bump is smaller than a size of an edge of a skeleton part of an information display body on a component or a product. The imaging unit captures an image including at least the information display body and thus formed textured pattern under specific image capturing conditions. The extraction unit extracts an image of the textured pattern from thus captured image. The registration unit registers in storing unit identification information for identifying a component or a product and image feature of the extracted textured pattern in associated with each other.

Figure 8:
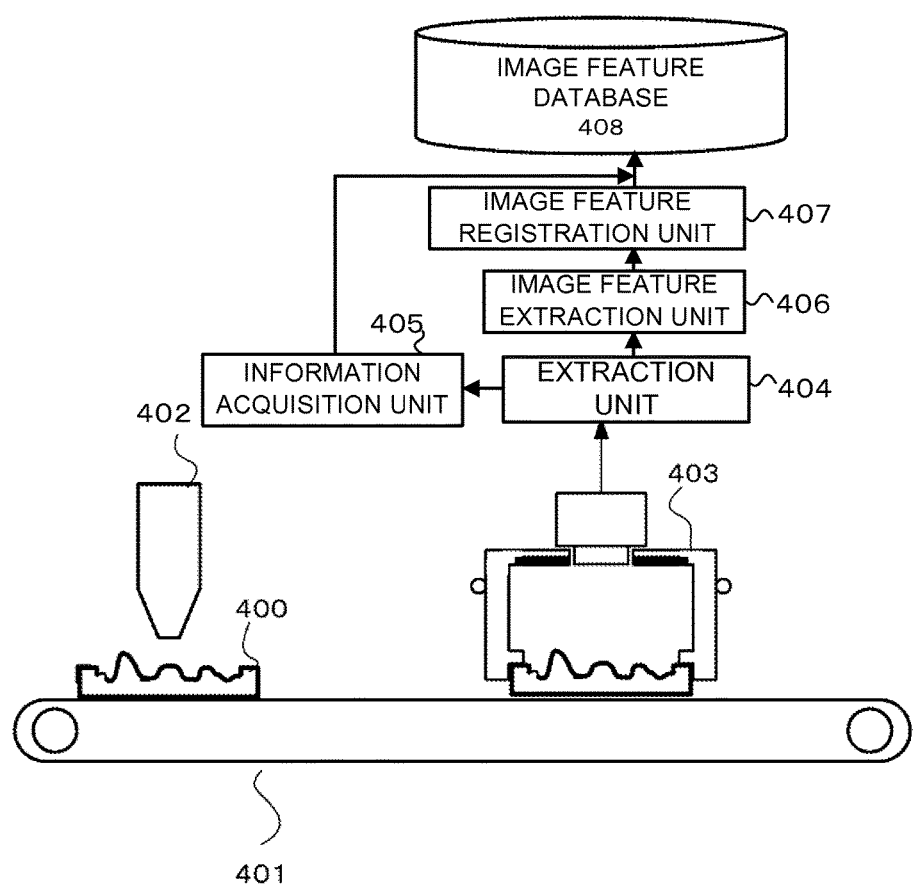
FIG. 8 is a block diagram of a fifth embodiment according to the present invention.

FIG. 8 is a block diagram of a registration apparatus of a fifth embodiment.

The registration apparatus of the fifth embodiment includes a belt conveyer 401, a textured pattern forming unit 402, an imaging unit 403, an extraction unit 404, an information acquisition unit 405, an image feature extraction unit 406, and an image feature registration unit 407. The belt conveyer 401 conveys a component 400. The textured pattern forming unit 402 forms a textured pattern on the component 400. The imaging unit 403 captures an image of the textured pattern of a collation area of the component 400 under specific image capturing conditions. The extraction unit 404 extracts an image of the information display body and the image of the textured pattern from the image captured by the imaging unit 403. The information acquisition unit 405 acquires identification information from the image of the information display body. The image feature extraction unit 406 extracts image feature from the image of the textured pattern. The image feature registration unit 407 registers the extracted image feature and identification information on the component in an image feature database 408 in associated with each other.

In the textured pattern forming unit 402, at least a portion of a prescribed area including the information display body attached to the component is provided with a textured surface which includes random dips and bumps. The resulting textured pattern surface is used for the purpose of matching. For example, the textured pattern can be provided by means of sand blasting or etching, blast plating, etc. However, any other method can also be employed. Further, it is preferable that a textured pattern is provided on a collation area of a skeleton part of a mark to be identified in a manner sharply defining the collation area. However, a small positional deviation, etc. can be tolerated since the positional deviation can be amended by the below mentioned step of image processing. Therefore, it is sufficient to form the textured pattern at least within the collation area.

The imaging unit 403 captures an image of the collation area of the component 400 on which a textured pattern is formed, while the component 400 is carried by the belt conveyer 401, by the method performed under the image capturing conditions described in the first embodiment. Subsequently, the imaging unit 403 outputs the captured image to the extraction unit 404.

The extraction unit 404 extracts an image of information display body and an image of textured pattern from the image captured by the imaging unit 403.

The information acquisition unit 405 acquires identification information from the image of the information display body extracted by the extraction unit 404. For example, identification information can be obtained by subjecting the image of the information display body to letters recognition processing, etc.

The image feature extraction unit 406 extracts image feature from the image of the textured pattern obtained by the extraction unit 404. Extraction of the image feature is performed with respect to the image captured by the imaging unit 403 by using an extraction technology for extracting image feature of a finger print. More specifically, a luminance value and a feature point of an image, an inflection point of a line of a binarized image, an interunit point, an inter-edge point, and a central point of an image are extracted by the extraction technology. Meanwhile, if necessary, the extraction of the image feature is performed, as described above, after normalization by using a skeleton part of the information display body.

The image feature registration unit 407 registers the image feature of the component 400 extracted by the image feature extraction unit 406 and the identification information on the component 400 indicated by the information display body in the image feature database 408 in associated with each other.

The registration apparatus as described above can automatically perform processing from formation of textured pattern for the purpose of identification to registration of image feature.

Meanwhile, the present registration apparatus may be configured without having the textured pattern forming unit 402.

Hereinbefore, the embodiments of the present invention are described. As apparent from the above description, it is possible to configure the image feature extraction unit, identification unit, etc. by hardware. Alternatively, it is possible to achieve functions of the image feature extraction unit, identification unit, etc. by using a computer program. In this case, functions and operations similar to those of the above described embodiments can be realized by a processor operated under operation of a program stored in a program memory.

Further, a portion of or whole of the above described embodiments can be described as, but not limited to, the following supplementary notes.

(Supplementary Note 1)

An information acquisition and identification system including image feature storage unit configured to store image feature of a textured pattern formed on a component or a product, extracting unit configured to extract an image of an information display body and an image of the textured pattern from an image including at least the information display body for displaying information on the component, the product, or a product including the component as its component and the textured pattern formed on the component or the products, acquiring unit configured to acquire information on the component or the products from the extracted image of the information display body, and identifying unit configured to identify the component, the product, or the product including the component as its component by matching image feature of the extracted image of the textured pattern with image feature stored in the image feature storage unit.

(Supplementary Note 2)

The information acquisition and identification system according to supplementary note 1, wherein the textured pattern is formed in order to identify the component, the product, or the product including the component as its component.

(Supplementary Note 3)

The information acquisition and identification system according to supplementary note 1 or supplementary note 2, wherein each dip and bump or granularity of each dip and bump of the textured pattern is formed into a size smaller than a width of an edge of a skeleton part of the information display body.

(Supplementary Note 4)

The information acquisition and identification system according to supplementary note 3, wherein the textured pattern is provided on each mold with predetermined granularity in order to identify a mold used in manufacturing, and wherein each individual is processed, in order to identify the each individual manufactured by the same mold, with granularity smaller than the granularity for the each mold.

(Supplementary Note 5)

The information acquisition and identification system according to any one of supplementary note 2 to supplementary note 4, further including forming unit configured to form the textured pattern in order to identify the component, the product, or the product including the component as its component, and image capturing unit configured to capture an image of the formed portion.

(Supplementary Note 6)

The information acquisition and identification system according to any one of supplementary note 1 to supplementary note 5, wherein the textured pattern is formed on a skeleton part of the information display body.

(Supplementary Note 7)

The information acquisition and identification system according to any one of supplementary note 1 to supplementary note 6, wherein the extracting unit configured to extracts the image of the textured pattern by removing a high frequency component corresponding to a dip and bump of a textured pattern from the captured image and taking a difference between the captured image and an image captured that the high frequency component is removed.

(Supplementary Note 8)

The information acquisition and identification system according to any one of supplementary note 1 to supplementary note 7, wherein the captured image and images of image feature stored in the image feature storage unit are to be captured under the same lighting conditions.

(Supplementary Note 9)

The information acquisition and identification system according to supplementary note 8, wherein an image is captured under the lighting conditions that a portion of a surface which is corresponding to a range within a prescribed angular range from a normal direction and facing to a forming surface of the textured pattern in a covering portion is blacken, the covering portion being formed so as to cover the forming surface of the textured pattern, and that surfaces corresponding to a range within another angular ranges are set to light source area-including surfaces for dispersing and emitting light received from a light source.

(Supplementary Note 10)

The information acquisition and identification system according to any one of supplementary note 1 to supplementary note 9, wherein the extracting unit normalizes the captured image by using the information display body.

(Supplementary Note 11)

The information acquisition and identification system according to any one of supplementary note 1 to supplementary note 10, wherein the information display body is identification information for identifying an origin or each individual of the component, the product, or the product including the component as its component, wherein the image feature storage unit stores the identification information and image feature of the textured pattern formed on the component, the product, or the product including the component as its component in associated with each other, and wherein the identifying unit identifies the component, the product, or the product including the component as its component of a captured image by matching the image feature of the textured pattern corresponding to the identification information of the information display body acquired from the captured image with the image feature of the textured pattern extracted from the captured image.

(Supplementary Note 12)

The information acquisition and identification system according to any one of supplementary note 1 to supplementary note 10, wherein the image feature storage unit and the identifying unit are provided in an identification server, wherein the information display body is a URL of the identification server, wherein the acquiring unit acquires the URL of the identification server from the extracted image of the information display body and transmits the captured image or the extracted image of the textured pattern to the identification server, and wherein the identification server identifies the component, the product, or the product including the component as its component by using the captured image or the extracted image of the textured pattern.

(Supplementary Note 13)

The information acquisition and identification system according to any one of supplementary note 1 to supplementary note 11, wherein the information display body includes at least one of a serial number, a trademark, a logo, a name of manufacturer, a name of producer, a brand name, a product name, a product number, a rod number, and a URL.

(Supplementary Note 14)

A processing system including textured pattern forming unit configured to form a textured pattern for identifying a component, a product, or a product including the component as its component on the component or the products to which an information display body displaying information on the component, the product, or the product including the component as its component is attached.

(Supplementary Note 15)

The processing system according to supplementary note 14, wherein the textured pattern forming unit forms a textured pattern of which granularity of each dip and bump is formed into a size smaller than a width of an edge of a skeleton part of the information display body on the component or the products, to which the information display body displaying information on the component, the product, or the product including the component as its component is attached.

(Supplementary Note 16)

A processing system according to supplementary note 15, wherein the textured pattern forming unit provides the textured pattern on each mold with predetermined granularity in order to identify a mold used in manufacturing, and wherein each individual is processed, in order to identify the each individual manufactured by the same mold, with granularity smaller than the granularity for the each mold.

(Supplementary Note 17)

The processing system according to any one of supplementary note 14 to supplementary note 16, wherein the textured pattern forming unit forms the textured pattern on a skeleton part of the information display body.

(Supplementary Note 18)

A registration system including image capturing unit configured to capture, under specific image capturing conditions, an image including at least a textured pattern and an information display body which displays information on a component, a product, or a product including the component as its component, extracting unit configured to extract the image of the textured pattern from the captured image, and registering unit configured to register in storing unit identification information for identifying the component or the products and image feature of the extracted image of the textured pattern in associated with each other.

(Supplementary Note 19)

The registration system according to supplementary note 18, further including textured pattern forming unit configured to form a textured pattern in which each dip and bump is formed into a size smaller than a width of an edge of a skeleton part of the information display body on the component or the products to which the information display body is attached.

(Supplementary Note 20)

The registration system according to supplementary note 18 or supplementary note 19, wherein the textured pattern is provided on each mold with predetermined granularity in order to identify a mold used in manufacturing, and wherein each individual is processed, in order to identify the each individual manufactured by the same mold, with granularity smaller than the granularity for the each mold.

(Supplementary Note 21)

The registration system according to any one of supplementary note 18 to supplementary note 20, wherein the textured pattern is formed in order to identify the component, the product, or the product including the component as its component.

(Supplementary Note 22)

The registration system according to any one of supplementary note 18 to supplementary note 21, wherein the textured pattern is formed on a skeleton part of the information display body.

(Supplementary Note 23)

A matching device including extracting unit configured to extract an image of an information display body and an image of a textured pattern from an image including at least the information display body for displaying information on a component, a product, or a product including the component as its component and the textured pattern formed on the component or the products, acquiring unit configured to acquire information on the component or the products from the extracted image of the information display body, and acquiring and outputting unit configured to acquire and output a matching result obtained by matching the extracted image of the textured pattern with a database which stores image feature of the textured pattern formed on the predetermined area.

(Supplementary Note 24)

The matching device according to supplementary note 23, wherein the textured pattern is formed in order to identify the component, the product, or the product including the component as its component.

(Supplementary Note 25)

The matching device according to supplementary note 23 or supplementary note 24, wherein granularity of each dip and bump of the textured pattern is formed into a size smaller than a width of an edge of a skeleton part of the information display body.

(Supplementary Note 26)

The matching device according to any one of supplementary note 23 to supplementary note 25, wherein the textured pattern is provided on each mold with predetermined granularity in order to identify a mold used in manufacturing, and wherein each individual is processed, in order to identify the each individual manufactured by the same mold, with granularity smaller than the granularity for the each mold.

(Supplementary Note 27)

The matching device according to any one of supplementary note 23 to supplementary note 26, wherein the textured pattern is formed on a skeleton part of the information display body.

(Supplementary Note 28)

The matching device according to any one of supplementary note 23 to supplementary note 27, wherein the extracting unit extracts an image of the textured pattern by removing a high frequency component corresponding to an dip and bump of a textured pattern from the captured image to take a difference between the captured image and an image that the high frequency component is removed.

(Supplementary Note 29)

The matching device according to any one of supplementary note 23 to supplementary note 28, wherein the captured image and images of image feature stored in the image feature storage unit are to be captured under the same lighting conditions.

(Supplementary Note 30)

The matching device according to supplementary note 29, wherein an image is captured under the lighting conditions that a portion of a surface which is corresponding to a range within a prescribed angular range from a normal direction and facing to a forming surface of the textured pattern in a covering portion is blacken, the covering portion being formed so as to cover the forming surface of the textured pattern, and that surfaces corresponding to a range within another angular ranges is set to light source area-including surfaces for dispersing and emitting light received from a light source.

(Supplementary Note 31)

The matching device according to any one of supplementary note 23 to supplementary note 30, wherein the extracting unit normalizes the captured image by using the information display body.

(Supplementary Note 32)

The matching device according to any one of supplementary note 23 to supplementary note 31, wherein the information display body includes at least one of a serial number, a trademark, a logo, a name of manufacturer, a name of producer, a brand name, a product name, a product number, a rod number, and a URL.

(Supplementary Note 33)

An information acquisition and identification method including extracting an image of an information display body and an image of a textured pattern from an image including at least the information display body for displaying information on a component, a product, or a product including the component as its component and the textured pattern formed on the component or the products, acquiring information on the component or the products from the extracted image of the information display body, and identifying the component, the product, or the product including the component as its component by using the extracted image of the textured pattern.

(Supplementary Note 34)

The information acquisition and identification method according to supplementary note 32, wherein the textured pattern is formed in order to identify the component, the product, or the product including the component as its component.

(Supplementary Note 35)

The information acquisition and identification method according to supplementary note 33 or supplementary note 34, wherein granularity of each dip and bump of the textured pattern is formed into a size smaller than a width of an edge of a skeleton part of the information display body.

(Supplementary Note 36)

The information acquisition and identification method according to supplementary note 33 to supplementary note 35, wherein the textured pattern is provided on each mold with predetermined granularity in order to identify a mold used in manufacturing, and wherein each individual is processed, in order to identify the each individual manufactured by the same mold, with granularity smaller than the granularity for the each mold.

(Supplementary Note 37)

The information acquisition and identification method according to any one of supplementary note 33 to supplementary note 36, wherein the textured pattern is formed in order to identify the component, the product, or the product including the component as its component, and wherein an image of the formed portion is captured.

(Supplementary Note 38)

The information acquisition and identification method according to any one of supplementary note 33 to supplementary note 37, wherein the textured pattern is formed on a skeleton part of the information display body.

(Supplementary Note 39)

The information acquisition and identification method according to any one of supplementary note 33 to supplementary note 38, wherein a high frequency component corresponding to an dip and bump of a textured pattern is removed from the captured image, and wherein the image of the textured pattern is obtained by taking a difference between the captured image and an image captured after removing the high frequency component.

(Supplementary Note 40)

The information acquisition and identification method according to any one of supplementary note 33 to supplementary note 39, wherein the captured image is captured under lighting conditions identical to that when capturing identification images preliminary stored for identification of the captured image.

(Supplementary Note 41)

The information acquisition and identification method according to supplementary note 40, wherein an image is captured under the lighting conditions that a portion of a surface which is corresponding to a range within a prescribed angular range from a normal direction and facing to a forming surface of the textured pattern in a covering portion is blacken, the covering portion being formed so as to cover the forming surface of the textured pattern and that surfaces corresponding to a range within another angular ranges is set to light source area-including surfaces for dispersing and emitting light received from a light source.

(Supplementary Note 42)

The information acquisition and identification method according to any one of supplementary note 33 to supplementary note 41, wherein the information display body is used to normalize the captured image.

(Supplementary Note 43)

The information acquisition and identification method according to any one of supplementary note 33 to supplementary note 42, wherein the information display body is identification information for identifying an origin or an individual of the component, the product, or the product including the component as its component, wherein correspondency between the identification information of the information display body and image feature of the textured pattern formed on the component, the product, or the product including the component as its component is stored, and wherein, based on the correspondency, the component, the product, or the product including the component as its component of the captured image is identified by matching the image feature of the textured pattern corresponding to the identification information of the information display body obtained from the captured image with the image feature of the textured pattern extracted from the captured image.

(Supplementary Note 44)

The information acquisition and identification method according to any one of supplementary note 33 to supplementary note 42, wherein the information display body is a URL of an identification site for identifying an origin or an individual of the component, the product, or the product including the component as its component by using the textured pattern, wherein the URL of the identification site is obtained from the information display body of the captured image, wherein the captured image or the extracted image of the textured pattern is sent to the identification site, and wherein, in the identification site, the component, the product, or the product including the component as its component is identified by using the captured image or the extracted image of the textured pattern.

(Supplementary Note 45)

The information acquisition and identification method according to any one of supplementary note 33 to supplementary note 43, where in the information display body includes at least one of a serial number, a trademark, a logo, a name of manufacturer, a name of producer, a brand name, a product name, a product number, a rod number, and a URL.

(Supplementary Note 46)

A program causing a computer to perform extraction processing extracting an image of an information display body and an image of a textured pattern from an image including at least the information display body for displaying information on a component, a product, or a product including the component as its component and the textured pattern formed on the component or the products, acquisition processing acquiring information on the component or the products from the extracted image of the information display body, and acquisition and output processing acquiring and outputting a matching result obtained by matching the extracted image of the textured pattern with a database which stores image feature of the formed textured pattern.

(Supplementary Note 47)

A program according to supplementary note 46, wherein the textured pattern is formed in order to identify the component, the product, or the product including the component as its component.

(Supplementary Note 48)

The program according to supplementary note 46 or supplementary note 47, wherein granularity of each dip and bump of the textured pattern is formed into a size smaller than a width of an edge of a skeleton part of the information display body.

(Supplementary Note 49)

A program according to supplementary note 48, wherein the textured pattern is provided on each mold with predetermined granularity in order to identify a mold used in manufacturing, and wherein each individual is processed, in order to identify the each individual manufactured by the same mold, with granularity smaller than the granularity for the each mold.

(Supplementary Note 50)

The program according to any one of supplementary note 46 to supplementary note 49, wherein the textured pattern is formed on a skeleton part of the information display body.

(Supplementary Note 51)

The program according to any one of supplementary note 46 to supplementary note 50, wherein the extraction processing extracts an image of the textured pattern by removing a high frequency component corresponding to andip and bump of a textured pattern from the captured image to take a difference between the captured image and an image that the high frequency component is removed.

(Supplementary Note 52)

The program according to any one of supplementary note 46 to supplementary note 51, wherein the captured image and images of image feature stored in the database are to be captured under the same lighting conditions.

(Supplementary Note 53)

The program according to supplementary note 52, wherein an image is captured under the lighting conditions that a portion of a surface which is corresponding to a range within a prescribed angular range from a normal direction and facing to a forming surface of the textured pattern in a covering portion is blacken, the covering portion being formed so as to cover the forming surface of the textured pattern, and that surfaces corresponding to a range within another angular ranges is set to light source area-including surfaces for dispersing and emitting light received from a light source.

(Supplementary Note 54)

The program according to any one of supplementary note 46 to supplementary note 53, wherein the extraction processing normalizes the captured image by using the information display body.

Although the present invention has been fully described by way of the examples with reference to the accompanying drawings, it is to be noted that the present invention is not limited to the above described embodiments. It is possible to carry out the present invention in the form of various changes and modifications unless otherwise such changes and modifications depart from the spirit and scope of the present invention.

This application claims the benefit of Japanese Application No. 2013-078801, filed Apr. 4, 2013, the disclosure of which is hereby incorporated by reference.

REFERENCE CHARACTER LIST

10 image feature storage unit
11 extraction unit
12 information acquisition unit
13 identification unit
41, 45 imaging unit
42, 46 extraction unit
43 information acquisition and registration unit
44, 54 image feature database
47, 57 information acquisition unit
49 identification unit
51, 55 imaging unit
52, 56 extraction unit
53 registration unit
60 identification server

What is claimed is:

1. An information acquisition and identification system comprising:

a storage that stores image feature of a textured pattern formed on a component or a product; and a processor programmed to:

extract an image of an information display body and an image of the textured pattern from an image including both the information display body for displaying information on the component, the product, or a product including the component as its component and the textured pattern formed on the component or the product, wherein the image of the information display body is obtained by removing a high frequency component corresponding to a dip and bump of the textured pattern from the image including both the information display body and the textured pattern, and the textured pattern is obtained by taking a difference between the image including both the information display body and the textured pattern and the image of the information display body obtained, acquire information on the component or the product from the extracted image of the information display body, and identify the component, the product, or the product including the component as its component by matching of the extracted image of the textured pattern with image feature stored in the storage.

2. The information acquisition and identification system according to claim 1:

wherein the processor is programmed to form the textured pattern for identifying the component, the product, or the product including the component as its component.

3. The information acquisition and identification system according to claim 1:

wherein granularity of each dip and bump of the textured pattern is formed into a size smaller than a width of an edge of a skeleton part of the information display body.

4. The information acquisition and identification system according to claim 3:

wherein the textured pattern is provided on each mold with predetermined granularity for identifying a mold used in manufacturing; and wherein each component or each product is processed, for identifying the each individual manufactured by the same mold, with granularity smaller than the granularity for the each mold.

5. The information acquisition and identification system according to claim 2, wherein the processor is further programmed to:

form the textured pattern for identifying the component, the product, or the product including the component as its component;

capture an image of the formed portion; and store the image of the formed portion captured in said storage.

6. The information acquisition and identification system according to claim 1:
wherein the textured pattern is formed on a skeleton part of the information display body.

7. The information acquisition and identification system according to claim 1:
wherein the image including both the information display body and the textured pattern and image of image feature stored in the storage are to be captured under the same lighting conditions.

8. The information acquisition and identification system according to claim 7:
wherein an image is captured under the lighting conditions that a first surface which is corresponding to a range within a prescribed angular range from a normal direction and facing to a forming surface of the textured pattern in a covering portion is blackened, the covering portion being formed so as to cover the forming surface of the textured pattern, and that a second surface and a third surface corresponding to other angular ranges are set to light source area-including surfaces for dispersing and emitting light received from a light source.

9. The information acquisition and identification system according to claim 1, wherein the processor is further programmed to:
normalize the image by using the information display body.

10. The information acquisition and identification system according to claim 1:
wherein the information display body is identification information for identifying an origin or each individual of the component, the product, or the product including the component as its component;
wherein the storage stores the identification information and image feature of the textured pattern formed on the component, the product, or the product including the component as its component in association with each other; and
wherein the processor is further programmed to identify the component, the product, or the product including the component as its component of a captured image by matching the image feature of the textured pattern corresponding to the identification information of the information display body acquired from the captured image with the image feature of the textured pattern extracted from the captured image.

11. The information acquisition and identification system according to claim 1:
wherein the storage and the processor are provided in an identification server;
wherein the information display body is a URL of the identification server, wherein URL is Uniform Resource Locator;
wherein the processor is further programmed to acquire the URL of the identification server from the extracted image of the information display body and transmits the captured image or the extracted image of the textured pattern to the identification server; and
wherein the identification server identifies the component, the product, or the product including the component as its component by using the captured image or the extracted image of the textured pattern.

12. The information acquisition and identification system according to claim 1:
wherein the information display body comprises at least one of a serial number, a trademark, a logo, a name of manufacturer, a name of producer, a brand name, a product name, a product number, a rod rot number, and a URL, wherein URL is Uniform Resource Locator.

13. A processing system comprising:
a processor programmed to form a textured pattern for identifying a component, a product, or a product including the component as its component on the component or the product to which an information display body displaying information on the component, the product, or the product including the component as its component is attached,
wherein the processor is programmed to form the textured pattern of which granularity of each dip and bump is formed into a size smaller than a width of an edge of a skeleton part of the information display body; and
wherein the textured pattern is provided on each mold with first granularity in order to identify a mold used in manufacturing, and,
wherein each component or each product on which the textured pattern has formed using the mold, is processed so as to generate bumps and dips with second granularity smaller than the first granularity, in order to identify the each component or each product manufactured by a same mold.

14. The processing system according to claim 13:
wherein the processor is further programmed to provide the textured pattern on each mold with predetermined granularity in order to identify a mold used in manufacturing; and
wherein each component or each product is processed, in order to identify the each individual manufactured by the same mold, with granularity smaller than the granularity for the each mold.

15. The processing system according to claim 13:
wherein the processor is further programmed to form the textured pattern on a skeleton part of the information display body.

16. A registration system comprising:
a processor programmed to:
capture an image including both a textured pattern and an information display body which displays information on a component, a product, or a product including the component as its component,
extract the image of the textured pattern previously presented from the captured image including both the textured pattern and the information display body wherein the image of the information display body is obtained by removing a high frequency component corresponding to a dip and bump of the textured pattern from the image including both the information display body and the textured pattern, and the textured pattern is obtained by taking a difference between the image including both the information display body and the textured pattern and the image of the information display body obtained; and
register in a storage identification information for identifying the component or the product and image feature of the extracted image of the textured pattern in previously presented association with each other.

17. The registration system according to claim 16, wherein the processor is further programmed to: textured pattern forming unit configured to form a textured pattern in which each dip and bump is formed into a size smaller than a width of an edge of a skeleton part of the information display body on the component or the products to which the information display body is attached.

18. The registration system according to claim 16:
wherein the textured pattern is provided on each mold with predetermined granularity for identifying a mold used in manufacturing; and
wherein each component or each product is processed, in order to identify the each individual manufactured by the same mold, with granularity smaller than the granularity for the each mold.

19. The registration system according to claim 16:
wherein the textured pattern is formed for identifying the component, the product, or the product including the component as its component.

20. The registration system according to claim 16:
wherein the textured pattern is formed on a skeleton part of the information display body.

21. A matching device comprising:
a processor programmed to:
extract an image of an information display body and an image of a textured pattern from an image including both the information display body for displaying information on a component, a product, or a product including the component as its component and the textured pattern formed on the component or the product, wherein the image of the information display body is obtained by removing a high frequency component corresponding to a dip and bump of the textured pattern from the image including both the information display body and the textured pattern, and the textured pattern is obtained by taking a difference between the image including both the information display body and the textured pattern and the image of the information display body obtained;
acquire information on the component or the product from the extracted image of the information display body; and
acquire and output a matching result obtained by matching the extracted image of the textured pattern with a database which stores image feature of the textured pattern.

22. An information acquisition and identification method performed by a processor comprising:
extracting an image of an information display body and an image of a textured pattern from an image including both the information display body for displaying information on a component, a product, or a product including the component as its component and the textured pattern formed on the component or the product, wherein the image of the information display body is obtained by removing a high frequency component corresponding to a dip and bump of the textured pattern from the image including both the information display body and the textured pattern, and the textured pattern is obtained by taking a difference between the image including both the information display body and the textured pattern and the image of the information display body obtained;
acquiring information on the component or the product from the extracted image of the information display body; and
identifying the component, the product, or the product including the component as its component by using the extracted image of the textured pattern.

23. A non-transitory computer readable storage medium storing program causing a computer to perform:
extraction processing extracting an image of an information display body and an image of a textured pattern from an image including both the information display body for displaying information on a component, a product, or a product including the component as its component and the textured pattern formed on the component or the product, wherein the image of the information display body is obtained by removing a high frequency component corresponding to a dip and bump of the textured pattern from the image including both the information display body and the textured pattern, and the textured pattern is obtained by taking a difference between the image including both the information display body and the textured pattern and the image of the information display body obtained;
acquisition processing acquiring information on the component or the products from the extracted image of the information display body; and
acquisition and output processing acquiring and outputting a matching result obtained by matching the extracted image of the textured pattern with a database which stores image feature of the formed textured pattern.

* * * * *